UNITED STATES PATENT OFFICE.

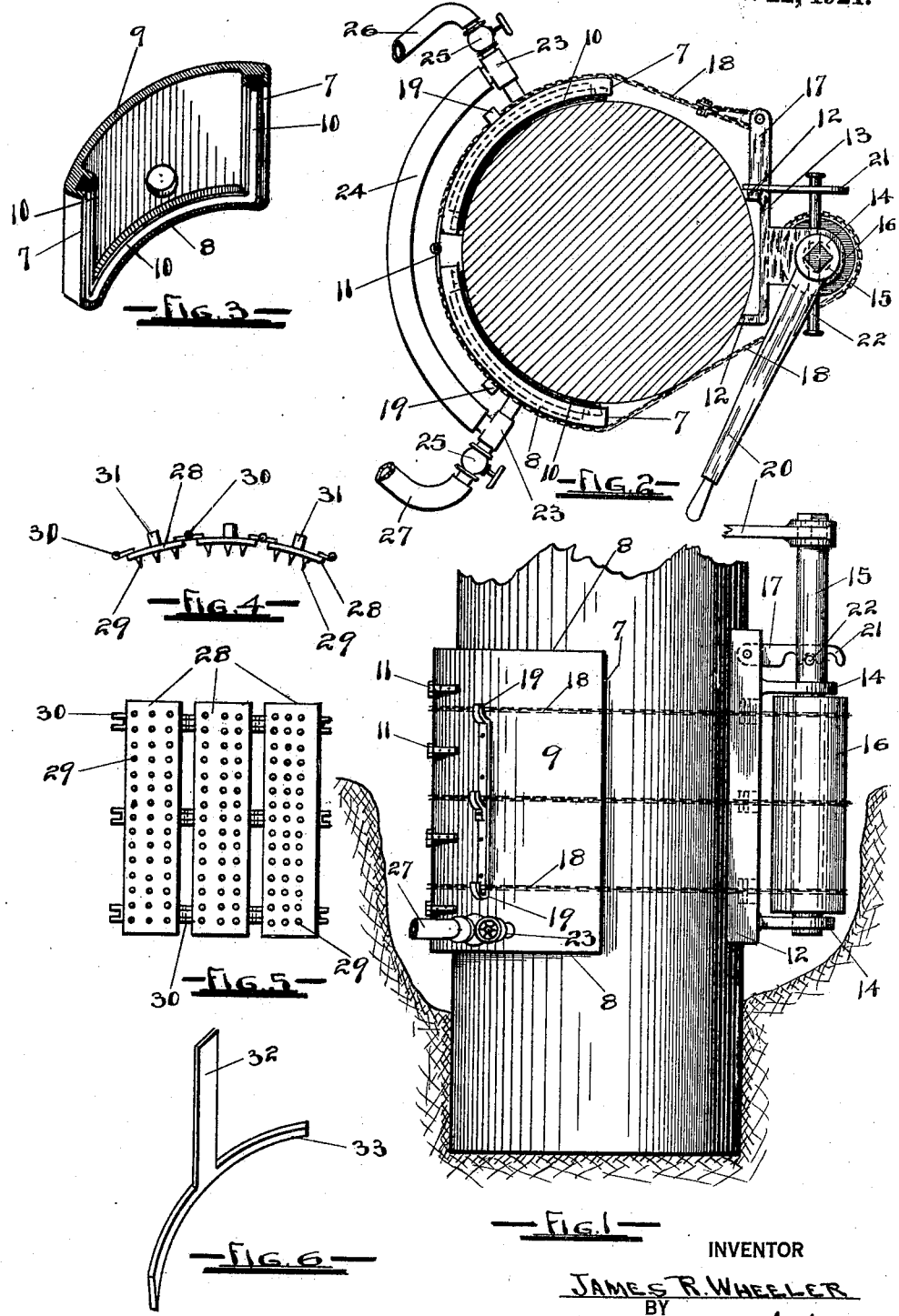

JAMES R. WHEELER, OF WINCHESTER, OREGON.

IMPREGNATOR.

1,398,212.  Specification of Letters Patent.  Patented Nov. 22, 1921.

Application filed April 5, 1920. Serial No. 371,477.

*To all whom it may concern:*

Be it known that I, JAMES R. WHEELER, a citizen of the United States, residing at Winchester, county of Douglas, State of Oregon, have invented certain new and useful Improvements in Impregnators, of which the following is a specification.

My invention relates to impregnators in general, and particularly to that type of impregnators used for treating posts with preservatives in liquid form.

The object of my invention is to provide a device that is easily portable, easily applied to standing posts, convenient to use and cheap to manufacture. I accomplish this object, and other desirable results that will hereinafter appear, by means of the construction illustrated in the accompanying drawing, which is a part of this application for Letters Patent, like characters of reference indicating like parts throughout the several views thereof, and in which:

Figure 1 is an elevation of a post with my device mounted thereon.

Fig. 2 is a plan view of the subject matter of Fig. 1.

Fig. 3 is a perspective view of a portion of one of the impregnating members.

Fig. 4 is a plan view of the puncturing member.

Fig. 5 is an elevation of the subject matter of Fig. 4.

Fig. 6 is a perspective view of a suitable tool for removing the puncturing member after the use thereof.

In general my device consists of a plurality of box like members open upon one side, the open sides of said members being curved to a radius, thus making each of said members an arc of a cylinder, means to clamp said members upon the periphery of a round post, packing means between each of said members and the post, and means to inject into each of said members a liquid preservative under pressure and to remove said liquid therefrom after the same has remained a sufficient time therein.

Each of the box like impregnating members is formed with sides 7 and ends 8, a back 9 connecting said sides and ends, thereby forming a box like structure open upon one side thereof, said back and said ends being curved, as shown in Figs. 2 and 3, thereby causing the member to form a portion of the surface of a cylinder. The inner surface of each of said sides 7 and said ends 8 is channeled, and a packing medium 10 of any suitable material is placed within said channel, the surface of said packing medium projecting beyond the surface of said sides and ends, as shown in Figs. 2 and 3. Thus, when the device is in place upon a post, the packing medium 10 contacts with said post, and as the impregnating members are drawn tightly upon the post, said packing medium securely separates the space within said members from the outside thereof, so that any liquid injected within said members under pressure will remain therein. Two or more of said members may be mounted upon a post, said members being conveniently joined by suitable hinges 11, as shown in Figs. 1 and 2.

To secure said impregnating members upon the post I provide a suitable winch consisting of a member having feet 12 adapted for contacting with the post, a body 13 joining said feet, arms 14 upon said body, a shaft 15 rotatably mounted within said arms, and a barrel 16 secured to said shaft between said arms, as shown in Figs. 1 and 2.

A plurality of arms 17 are provided, preferably integral with the body 13 and one of the legs 12, and suitable flexible tension members, preferably chains 18 are secured respectively to said arms 17, said chains being passed from said arms around the outside of the impregnating members, thence to the barrel 16 to which they are secured.

Suitable hooks 19 are provided upon the outside of the backs 9 of the impregnating members for supporting the respective chains 18 while the device is being mounted upon the post.

A lever 20 is secured to the top of the shaft 15 which may conveniently be squared to receive said lever, as shown in Figs. 1 and 2, for the purpose of rotating the barrel 16 to tighten the chains 18. To hold the chains in tightened condition I provide a notched bar 21 pivoted to one of the legs 12 and a bar 22 mounted in an orifice in the shaft 15 and adapted to coact with said notched bar 21 to prevent rotation of said shaft when said bar 22 is engaging one of the notches in the notched bar 21, as shown in Fig. 1.

To inject liquid preservative into the impregnating members I provide each thereof with a pipe 23, said pipes being connected by a flexible pipe member, conveniently a hose 24. Just outside the hose connections to said pipes 23 I provide in each of said pipes a valve 25. One of said pipes with its respective valve is connected by a hose 26 to a pressure pump supplying the liquid preservative under pressure, and the other of said pipes with its respective valve is connected by a hose 27 to a vacuum pump.

In operating my device, after the same has been secured upon the post, the valve 25 adjacent the hose connection 27 is closed, and the valve 25 adjacent the hose connection 26 is opened, thus closing the exit from the impregnating members and opening them to the entrance of the liquid preservative under pressure from the pressure pump. After a sufficient time has elapsed for the thorough impregnation of the post with the liquid preservative, the valve 25 adjacent the hose connection 26 is closed, and the valve 24 adjacent the hose connection 27 is opened, thus allowing the excess liquid preservative remaining within the impregnating members to be removed therefrom by the vacuum pump. After such removal of the excess preservative, the chains 18 are slacked and the entire device rotated around the post until the impregnating members occupy new positions, whereupon the chains are again tightened and the preservative injected into the impregnating members. Thus by repeated operations the entire periphery of the post may be treated with preserative under pressure.

My device may conveniently be applied to standing posts by simply digging the earth from around the post, as shown in Fig. 1, and placing the device in the excavation thus made.

To assist and hasten the process of impregnation I provide a plurality of curved plates 28 having upon the convex surface thereof a plurality of sharpened pegs 29, said plates being joined together by suitable hinges 30, and having upon the convex surfaces thereof hooks 31 similar to the hooks 19 upon the impregnating members, for supporting the chains 18 when mounting the plates 28 upon the post. These plates 28 are mounted upon the post by means of the winch above described in connection with the impregnating members, and then as the chains 18 are tightened the sharpened pegs 29 are forced into the surface of the post, thus providing indentations therein into which the liquid preservative will be forced upon application thereof by means of the impregnating members above described.

To remove the plates 28 from the post I provide a conveniently shaped lever consisting of a handle 32 and a curved portion 33, shown in detail in Fig. 6. In use this curved portion 33 is placed between the upper edge of the plates 28 and the post and the handle moved outward from the post, thereby prying the plates therefrom.

My device may be made of any size, and constructed of any materials deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. An impregnator comprising an impregnating member of box like construction applicable to the peripheral surface of a post; a packing medium upon the edges of said member; a winch; flexible tension members connecting said impregnating member with said winch; and means to supply a liquid preservative under pressure to said impregnating member.

2. A box like impregnating member open upon one side thereof adapted for application upon the peripheral surface of a post; a packing medium upon said impregnating member adapted to contact with said post; means to mount said impregnating member upon said post; and means to inject into said impregnating member a liquid preservative.

3. In a device for impregnating a standing post; with a liquid preservative, a winch adapted for being mounted upon said post; flexible tension members mounted upon said winch and embracing said post; indenting members provided with suitable pegs for making indentures upon the peripheral surface of said post adapted to be clamped between said flexible members and said post; and impregnating members adapted to receive a liquid preservative under pressure and to be clamped between said flexible members and the peripheral surface of said post.

4. In a device for impregnating standing posts, means to produce a plurality of indentations upon the peripheral surface of said post; means to attach a box like impregnating member upon the peripheral surface of said post; and means to inject a liquid preservative into said impregnating member.

5. Means to impregnate a standing post with a liquid preservative under pressure, comprising members for covering the peripheral surface to be impregnated; means for clamping said covering means upon the post; and means for injecting a liquid preservative under pressure into said covering means.

6. In an impregnating device for standing posts, a box like member adapted to fit the peripheral surface of said post and having an open side adjacent said post; a packing medium intermediate said box like member and said posts; flexible tension members embracing said box like member and said post; means for tightening said flexible tension members; and means for injecting a liquid preservative under pressure into said box like member.

In witness whereof I claim the foregoing as my own I hereunto affix my signature in the presence of two witnesses, at Winchester, county of Douglas, State of Oregon, this 3rd day of March, 1920.

JAMES R. WHEELER.

Witnesses:
R. L. WHIPPLE,
CARL W. OHMAN.